United States Patent [19]

Riley et al.

[11] Patent Number: 5,200,162

[45] Date of Patent: Apr. 6, 1993

[54] PROCESS FOR $N_2O$ DECOMPOSITION

[75] Inventors: Brian W. Riley, High Barnet; John R. Richmond, High Beach, both of United Kingdom

[73] Assignee: UOP, Des Plaines, Ill.

[21] Appl. No.: 862,016

[22] Filed: Apr. 1, 1992

[51] Int. Cl.$^5$ .......................... B01J 8/00; C01B 21/00
[52] U.S. Cl. .................................................... 423/239
[58] Field of Search ............................ 423/239, 239 A

[56] References Cited

U.S. PATENT DOCUMENTS

| | | | |
|---|---|---|---|
| 4,571,329 | 2/1986 | Kato et al. | 423/239 |
| 4,877,743 | 10/1989 | Waugh et al. | 423/239 |
| 4,933,158 | 6/1990 | Aritsuka et al. | 423/239 |
| 5,043,150 | 8/1991 | Hiltunen et al. | 423/239 |

Primary Examiner—Gregory A. Heller
Attorney, Agent, or Firm—Thomas K. McBride; Eugene I. Snyder

[57] ABSTRACT

The exothermicity attending decomposition of $N_2O$ to nitrogen and oxygen can lead to a multiplicity of process difficulties associated with high process temperatures. An improved process is one where a portion of the exit gases, depleted in $N_2O$, is first cooled and then recycle to the $N_2O$-decomposition zone. The process is amenable to process control to afford a very stable process largely independent on the particular catalyst used for $N_2O$ decomposition. Where the $N_2O$-containing waste gas stream also contains $NO_x$, if it often highly desirable to pretreat the stream to remove $NO_x$ prior to the $N_2O$-decomposition zone.

14 Claims, 2 Drawing Sheets

PROCESS FOR N₂O DECOMPOSITION

BACKGROUND OF THE INVENTION

Nitrous oxide, N$_2$O, frequently referred to as laughing gas, recently has been increasingly investigated as an undesirable component of gaseous emissions. Although formed in nature from bacterial action in soils and oceans, the levels associated with such "natural" emissions are not an environmental concern, a concern which arises in part from its relative unreactivity contributing to ozone layer depletion, and in part from its acting as a greenhouse gas, analogous in effect to carbon dioxide but far more potent. However, atmospheric levels of N$_2$O are found to be increasing bringing with it increased concern for its accumulation. One small but significant source of N$_2$O is that of adipic acid manufacture, where N$_2$O formation accompanies the nitric acid oxidation of cyclohexanone. Exit gases from the aforementioned reaction may contain quite high concentrations (about 30 volume percent) of N$_2$O and are discharged directly into the atmosphere. Off gases from nitric acid plants also are being recognized as a source of N$_2$O, although perhaps in significantly lower exit gas concentration, but nonetheless in substantial total amounts. Other N$_2$O-emission sources are the manufacture of hydroxylamine derivatives, caprolactam production, and the low temperature combustion of nitrogen-containing materials, as in fluid bed incinerators. With increasing global environmental sensitivity generally, and with more stringent local requirements particularly, there has arisen a need for implementing a process for N$_2$O destruction which addresses the concerns attached to emissions containing substantial amounts and/or concentrations of N$_2$O.

Several catalyst systems are known to effect the thermal decomposition of nitrous oxide to nitrogen and oxygen. However effective these may be, some inherent characteristics of nitrous oxide decomposition largely independent of the particular catalyst system used introduce complexities which the process of this invention addresses. In particular, even though N$_2$O decomposition is a highly exothermic reaction, whose heat of reaction is approximately 19.5 kcal mole$^{-1}$, its decomposition is initiated by most catalytic systems at a temperature of several hundred degrees centigrade. Where the catalyst is used as a solid bed, the large reaction exotherm coupled with a high space velocity of the N$_2$O-containing gas stream through the reactor means that there is a considerable temperature increase within and along the catalyst bed, an increase which easily can reach several hundred degrees centigrade. But such a large temperature increase across the catalyst bed can have several adverse consequences. One potential detriment is sintering of the catalyst and/or catalyst support leading to a reduction of catalyst activity and a reduction in catalyst life. Another detriment is that many catalysts used for the decomposition of N$_2$O also can effect the reaction of nitrogen and oxygen to form NO$_x$. Thus, it is often desirable to have some maximum temperature, T$_{max}$, in the catalyst bed to avoid the foregoing detriments. This maximum temperature will depend primarily on the catalyst and should not be exceeded despite changes in the N$_2$O-containing feed, feed rate, the temperature necessary to initiate N$_2$O decomposition, and other reaction variables.

Although many ways are possible to ensure this outcome, we have found that a particularly effective means is to cool some portion of the effluent gas and to recycle the cooled effluent gas to one or more points along the decomposition zone. By varying the amount of effluent gas recycled, the degree to which it is cooled, the points at which it is recycled to the decomposition zone, and/or feed flow rate, it is possible to maintain the temperature everywhere in the decomposition zone less than T$_{max}$ while maintaining a high throughput of the N$_2$O-containing waste gases in the decomposition zone.

SUMMARY OF THE INVENTION

The purpose of this invention is to provide a process for the catalytic decomposition of N$_2$O where the exothermicity of the reaction is controlled so as to maintain temperatures within the decomposition zone under some predetermined maximum, T$_{max}$. In one embodiment a N$_2$O-containing gas stream is passed over a N$_2$O-decomposition catalyst in a N$_2$O-decomposition zone, and all or some part of the effluent gas from the decomposition zone is cooled and recycled to the decomposition zone in order to maintain all temperatures therein under T$_{max}$. In another embodiment signals representative of the flow rate of the gas stream entering the decomposition zone and of the temperature at at least one point within the decomposition zone, are used to control the amount of cooled effluent gas recycled to the decomposition zone, the degree of cooling effected, and the points within the decomposition zone to which the cooled effluent gas is recycled. Yet another embodiment incorporates a NO$_x$ removal zone prior to the N$_2$O decomposition zone, especially where there is greater than 100 ppm NO$_x$ in the N$_2$O-containing gas stream. Other embodiments will be apparent from the ensuring description.

DESCRIPTION OF THE INVENTION

Figure 1:
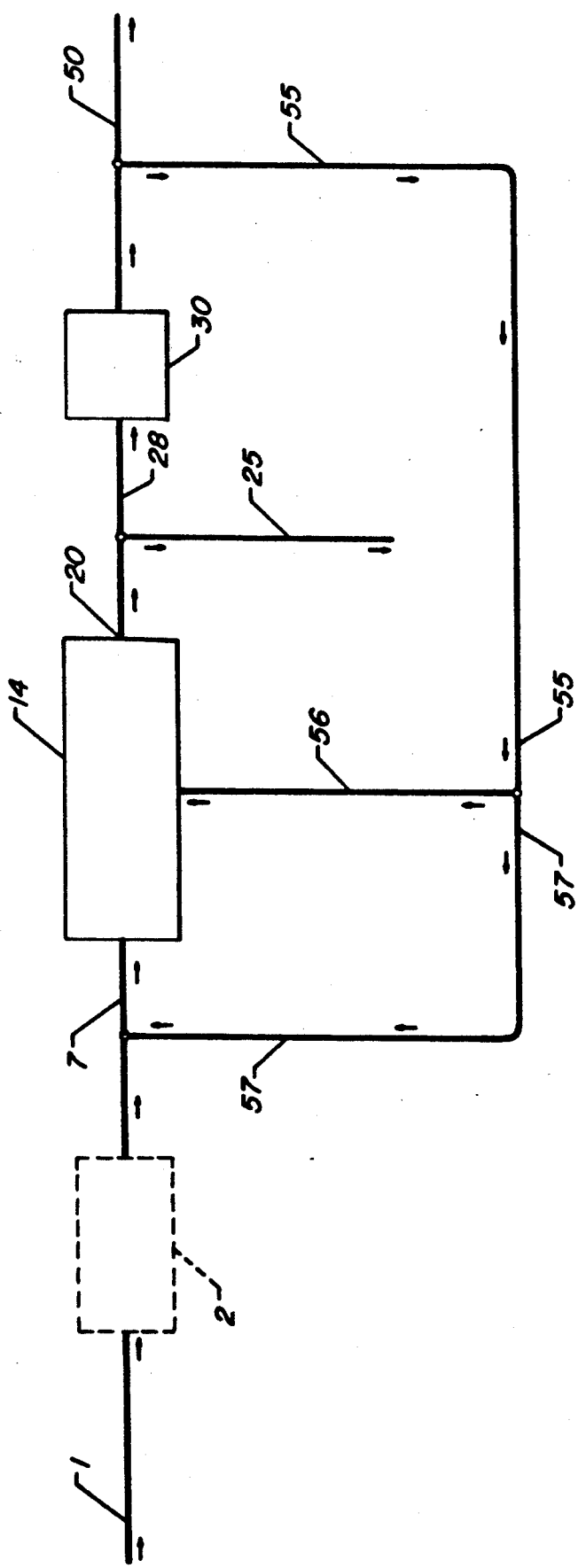
FIG. 1 is a process flow diagram for our invention.

The process of our invention is depicted in FIG. 1 and may be viewed in different aspects and at different levels. In one aspect the process is one where a N$_2$O-containing gas, generally a waste gas stream, is passed into a decomposition zone which effects cleavage of N$_2$O into oxygen and nitrogen. At least a part of the effluent from the decomposition zone is then cooled, and some or all of the cooled effluent is recycled to the decomposition zone, acting as a diluent and/or as a coolant, but in any event causing a reduction in the temperature of the decomposition zone and maintaining it within the predetermined limits.

In another aspect and at another level the process is a controlled one for decomposing N$_2$O in a waste gas stream into nitrogen and oxygen using a solid catalyst in a decomposition zone, cooling at least a portion of the effluent gas from the decomposition zone, and recycling at least some of the cooled effluent gas to the decomposition zone. The temperature within the decomposition zone is measured at one or more locations, and the signal(s) provided by the temperature measuring means is then used, directly or otherwise, as input to a processor or computer operating according to a predetermined algorithm to control some combination of the waste gas feed rate, the amount of effluent gas cooled, the degree to which the effluent gas is cooled, the amount of cooled effluent gas recycled to the decomposition zone, and the location(s) within the decomposition zone to which it is recycled. The purpose of such control is to ensure that the temperatures within the decomposition zone are at all times and places below some predetermined maximum temperature $T_{max}$ in order to maximize catalyst life, catalyst activity, and to minimize subsequent formation of $NO_x$ within the decomposition zone where this is important.

The feedstocks which are used in the practice of our invention are generally $N_2O$-containing waste gases produced by one or more industrial processes and are susceptible to a very great diversity of composition. At one extreme the gas stream to be treated by the catalyst may be essentially pure $N_2O$. Such a case will be infrequent; more usually the gas stream contains up to about 65 volume percent of $N_2O$, and even more typically does not contain more than about 35 volume percent $N_2O$. In the most prevalent case the $N_2O$-containing gas stream also contains water, and in fact may be saturated with water vapor at the gas stream temperature. The amount of water present in the gas stream, even if at saturation, will depend on such factors, inter alia, as gas stream temperature, pressure, and pretreatment, if any. However, the water content is most likely to be in the range of 1-2 volume percent. It needs to be recognized, however, that the presence of water and its amount is not a limitation of our invention in any way. What we are describing is a typical $N_2O$-containing waste gas stream, and this typical stream contains water vapor, most typically in the range of 1-2 volume percent.

The $N_2O$-containing gas stream generally, but not necessarily, also contains oxygen to the extent of at least 0.5 volume percent, more often in the range of 3-15 volume percent, and in extreme cases where the gas stream is at, e.g., 15 atmospheres pressure, may contain oxygen at a partial pressure up to about 3 atmospheres. The waste gas stream to be treated may also contain variable amounts of volatile organic compounds as well as other nitrogen oxides. The nature of the components in the gas stream other than $N_2O$ is not of particular relevance so long as these components do not interfere with $N_2O$ decomposition and do not adversely affect the catalyst used in the decomposition zone. Where the gas stream contains other oxides of nitrogen, the so-called $NO_x$, especially at concentrations above about 100 ppm, the process as described below may need to be modified to remove $NO_x$ prior to the $N_2O$-decomposition zone. But this aspect will be discussed anon.

The feedstock is then passed into a decomposition zone containing a solid catalyst which effects the decomposition of $N_2O$ into nitrogen and oxygen. Most such catalysts require a minimum temperature, $T_{min}$, below which $N_2O$ decomposition is not effected. In one variant the feedstock is heated to a temperature of at least $T_{min}$ to ensure reaction occurring even at the inlet of the decomposition zone, i.e., reaction occurs from the very start of the catalyst bed present in the decomposition zone. In another variant at least some part of the decomposition zone may be heated to at least $T_{min}$ to initiate decomposition. Because of the high exothermicity of the reaction, once decomposition of $N_2O$ has begun it generally generates sufficient heat to be self-sustaining, and not only is no further heating required but in fact cooling is needed to maintain all points within the decomposition zone at a temperature less than some predetermined maximum, $T_{max}$, which corresponds to the onset of catalyst sintering, $NO_x$ formation, or some other deleterious and undesirable process.

It also needs to be mentioned that the minimum temperature initially needed to sustain the reaction along the catalyst bed may not be the same as that established at steady state conditions. Thus, it is observed with some regularity that a higher temperature, $T_a$, is required to initiate the decomposition of $N_2O$ at start-up than the temperature, $T_b$, required to maintain the decomposition across the catalyst bed after the system is operating at a steady state, i.e., $T_a > T_b$, and sometimes $T_a >> T_b$.

The catalyst in the decomposition zone is a solid catalyst, and the decomposition zone itself is generally a reactor containing the catalyst as a bed or as a monolith. Although the most usual bed configuration is one where the catalyst is present as a fixed bed, configurations where the catalyst is present as a fluidized bed, an ebullating bed, a radial bed, and so on are within the scope of this invention. It can not be overemphasized that it is not the kind of catalyst or particular configuration of catalyst bed used that is our invention but rather the process in which the catalyst is used. Except for operating details, it must be stressed that the practice and success of the process which is our invention is independent of catalyst type and catalyst configuration. This realization must be borne in mind as the details of our process are elaborated and should not be obscured by the admittedly important differences among various catalysts which will become apparent from our ensuing general discussion of $N_2O$-decomposition catalysts undertaken primarily to illustrate the range of catalysts which may be used in our invention.

Various kinds of materials have been utilized as solid catalysts for the decomposition of $N_2O$, but it appears possible to classify them into four categories; metal oxides, metals, zeolites, and a nondescript group encompassing a diversity of otherwise unrelated materials. For example, removal of nitrous oxide from gas using catalysts from group Ib or group VIII as their oxides is the subject of JP 63007862-A2. In U.S. Pat. No. 4,259,303 $N_2O$ was decomposed to nitrogen and oxygen by passing waste anesthetic gas over a catalyst comprising at least 1 metal oxide selected from the group consisting of ferric oxide, cobalt oxide, cupric oxide, chromium oxide, manganese dioxide and nickel oxide at a temperature of 250°-650° C. U.S. Pat. No. 3,459,494 describes a process for substantially complete decomposition of nitrogen oxide into nitrogen and oxygen where the gas is contacted with a catalyst of an alkali metal oxide, an alkali metal silicate, an alkaline earth metal oxide, an alkaline earth metal silicate, or mixtures thereof at a temperature above 700° C. JP61153142 teaches that a catalyst of 75 weight percent $Co_xO_y$ (y/x up to 1.5) with the remainder as copper and manganese oxides can be used as catalyst for decomposition of nitrogen oxides, including $N_2O$. GB2059934 claims that $N_2O$ is removed from waste anesthetic gas using a catalyst comprising at least one of ferric, cobalt, cupric, nickel and chromium oxides and manganese dioxide at 250°-650° C.

Illustrative of the use of metals as $N_2O$ catalysts is JP86045487-B which reports that $N_2O$ in anesthetic gas is removed by passage through a catalyst composed of an iron family metal (iron, nickel, cobalt, etc.), a rare earth metal oxide, and a platinum family metal at 150°-550° C. JP86045486-B teaches that a catalyst comprising at least one of platinum, palladium, rhodium, and iridium, and ruthenium effects decomposition at temperatures 150°–550° C. Palladium on alumina has been used to effect >99% decomposition at 300°–400° C. and 5000 per hour gas hourly space velocity (GHSV) [*Chem. Abst.*, 109(2): 11062s].

As an example of the use of zeolitic materials one can mention U.S. Pat. No. 4,507,271, which describes the removal of $N_2O$ from gases containing hydrogen, NO, and $N_2O$ by treatment with molecular sieves, preferably A-, X-, or Y-zeolites. L. M. Aparicio, *J. Catal.*, 104, 381 (1987) studied the decomposition of $N_2O$ in flowing helium at 800° K. (527° C.) and 1 atmosphere using iron-exchanged, silicon-substituted Y zeolites as a catalyst. The decomposition of $N_2O$ at 600°–750° K. and at initial nitrous oxide pressure of about 60 mm Hg was studied using certain cobalt/magnesium/alumina spinel solid solutions by C. Angeletti, *J. Chem. Soc., Faraday Trans.*, 74, 1595 (1978). J. Leglise used iron-exchanged mordenite and compared his results with that obtained using iron Y-zeolites at temperatures apparently above about 250° C. [*Chem. Abst.*, 100(18): 145662k]. Mordenite-type zeolites exchanged by alkali and rare earth metals were studied in the thermal decomposition of $N_2O$ at 250°–600° C. by A. A. Slinkin [*Chem. Abst.*, 97(20): 169727f].

SU1011238 reports a catalyst for $N_2O$ decomposition at 170° C. with 99% efficiency contains calcium carbide, calcium oxide, sodium chloride, activated carbon, iron-silicon, aluminum chloride, magnesium chloride, manganese chloride, silicon carbide and calcium chloride. Copper (II) complexes of dibenzothiophenes and carbazoles have been used for thermal decomposition of $N_2O$ at 483–533K; SU1237248-A.

Another catalyst which may be used in our invention is one composed of a first metal oxide as a support on which is dispersed a second metal oxide, and we here give a more detailed description of these materials as illustrative and exemplary of catalysts which may be employed in our invention. The first metal oxide used as a support is a refractory inorganic oxide which is either tin(IV) or a rare earth metal oxide, where the rare earth is that of atomic number 57–71, or any combination thereof. The rare earth metals are preferred as the metal(III) oxides except for cerium(IV) oxide. Favored among the rare earth metal oxides are those of cerium-(IV), lanthanum(III), praesodymium(III), erbium(III), thulium(III), ytterbium(III), and lutetium(III), with cerium(IV) and lanthanum(III) oxides particularly recommended. The oxides used were rather low surface area materials, and it was quite unexpected that they showed unique qualities as a support in this invention. Although other oxides were extensively examined as a support, catalyst using them showed hysteresis and/or were deactivated in the presence of water and/or oxygen. Although it is uncertain why tin and the rare earth metal oxides are so unique, it appears that they exhibit strong metal-support interactions with the second metal oxides dispersed on them. S. J. Tauster et al., *Science*, 211, 1121 (1981); U.S. Pat. No. 4,149,998. Among the foregoing tin(IV) oxide is particularly desirable as a support, especially from a cost and availability standpoint.

The tin or rare earth metal oxide of the instant invention may be used in any configuration, shape or size which exposes the tin or rare earth metal oxide and any other catalytic components dispersed thereon to the gas to be treated. For example, the tin or rare earth metal oxide can be conveniently employed in particulate form, the tin or rare earth metal oxide can be deposited onto a solid monolithic carrier, or the monolith may be extruded or formed as the tin or rare earth oxide. When a particulate form is desired, the tin or rare earth metal oxide can be formed into shapes such as pills, pellets, granules, rings, spheres, etc. The particulate form is especially desirable where large volumes of catalysts are needed, and for use in circumstances in which periodic replacement of the catalyst may be desired. In circumstances in which less mass is desirable or in which movement or agitation of particles of tin or rare earth metal oxide may result in attrition, dusting and resulting loss of dispersed metals or undue increase in pressure drop across the particles, a monolithic form is preferred.

In the employment of a monolithic form, it is usually most convenient to employ the tin or rare earth metal oxide as a thin film or coating deposited on an inert carrier material which provides the structural support for said tin or rare earth metal oxide. The inert carrier material can be any refractory material such as ceramic or metallic materials. It is desirable that the carrier material be unreactive with the catalytic components and not be degraded by the gas to which it is exposed. Examples of suitable ceramic materials include silica, sillimanite, petalite, cordierite, mullite, zircon, zircon mullite, spondumene, alumina-titanate, etc. Additionally, metallic materials which are within the scope of this invention include metals and alloys as disclosed in U.S. Pat. No. 3,920,583 (incorporated herein by reference) which are oxidation resistant and are otherwise capable of withstanding high temperatures.

The monolithic carrier material can best be utilized in any rigid unitary configuration which provides a plurality of pores or channels extending in the direction of gas flow. The configuration may be a honeycomb, foam, or planar catalyst configuration or in any other form which affords a high surface area. The structures can be used advantageously in either unitary form, or as an arrangement of multiple modules. The honeycomb structure, for example, is usually oriented such that gas flow is generally in the same direction as the cells or channels of the honeycomb structure. For a more detailed discussion of monolithic structures, refer to U.S. Pat. No. 3,785,998 and U.S. Pat. No. 3,767,453, which are incorporated herein by reference.

If a particulate form is desired, the tin or rare earth metal oxide can be formed into granules, spheres or extrudates by means well known in the industry. For example, a tin or rare earth metal oxide powder can be combined with a binder such as a clay and rolled in a disk pelletizing apparatus to give tin or rare earth metal oxide spheres. The amount of binder can vary considerably but for convenience is present in an amount generally from about 10 to about 30 weight percent.

A second metal oxide is dispersed on the support, where the second metal oxide is palladium oxide, platinum oxide, iridium oxide, ruthenium oxide, osmium oxide, gold oxide, indium(III) oxide, rhodium oxide, or any combination of them, at atypically high concentrations affording from 0.05 up to about 25 weight percent expressed as the metal. (In this application, unless stated otherwise the weight percent of second metal oxide will be expressed as the metal contained therein and is based on the finished catalyst weight [second metal oxide plus first metal oxide, plus promoter, if any], exclusive of monolith, if any.) However, concentrations in the range of 1–18 weight percent are preferred, with those in the range of 3–15 weight percent even more highly preferred, especially where $NO_x$ formation is to be avoided. Palladium and, to some extent, rhodium are somewhat preferred over platinum, and a particularly desirable catalyst is one where the support is tin(IV) oxide bearing palladium oxide, especially where the latter is at a concentration to give 1-18 weight percent palladium.

The aforedescribed catalysts also may be promoted by various cations, especially those of the alkali and alkaline earth metals. Thus, increased catalyst activity often results from the presence of one or more of sodium, lithium, potassium, magnesium, calcium, barium, and strontium cations, in any combination, typically present in a total amount from about 0.1 to about 10 weight percent based on the finished catalyst (exclusive of monolith). Preference among the foregoing cations is given to lithium, magnesium and calcium. Tungsten(IV) oxide, lead oxide, bismuth oxide, and tin(II) oxide also may be useful as a promoter.

The preparation of these catalysts is unexceptional, and many methods well known to the skilled worker will suffice. For example, tin oxide may be impregnated with the requisite amount of a second metal salt, as by contacting the support with an aqueous solution containing the desired amount of the metal salt, rolling the mixture while evaporating the water, and finally drying the impregnated support at a temperature in the range of, e.g., 110°-150° C. The dried impregnated support then may be calcined in air, often at a temperature in the range of 300°-400° C., to convert the second metal to its oxide and provide the finished catalyst which may be reduced or used directly without any further treatment.

In a preferred embodiment the second metal oxides are present largely at or near the surface of the first metal oxide support. That is, the first metal oxides are not uniformly dispersed throughout the bulk of the support but instead are preferentially concentrated in a shallow layer at and near the support surface. Such selective surface impregnation or concentration may be achieved by any means generally available and include using co-additives such as thioacetic acid, spray coating with restricted volumes of metal-containing solution, impregnation of pore-filled support (obtained by pre-soaking in a suitable liquid) with a metal-containing solution, and selective metal precipitation, to name but a few. See U.S. Pat. No. 4,519,951 and references cited therein.

Especially where the feedstock contains high concentrations of $N_2O$ the exothermicity of the latter's decomposition results in a temperature within at least one portion of the decomposition zone sufficiently high to effect catalyst sintering or to bring about oxidation of nitrogen to higher nitrogen oxides, $NO_x$, which may be undesirable. It is for these reasons, inter alia, that at least a portion of the effluent gases depleted in $N_2O$ and enriched in nitrogen and oxygen are directed to a cooling zone. It is important to understand that the process does not need to be carried out so that all of the $N_2O$ is decomposed in the decomposition zone, or that the effluent gases from the decomposition zone be essentially devoid of $N_2O$. Our process can be effected using many variations; it is unnecessary to introduce as a limitation the requirement that $N_2O$ decomposition be essentially complete.

As stated above at least a portion of the effluent from the decomposition zone is cooled in a cooling zone. The amount of effluent gas which is cooled and the degree of cooling is a function of feedstock, catalyst, feed rate, operating conditions generally, and reactor design. What is needed is to cool some portion of effluent sufficiently so that upon its recycle to the decomposition zone it will ensure that at all points within the decomposition zone the temperature does not exceed $T_{max}$. Even though it is not feasible to give the amount of effluent cooled and its degree of cooling in closed form as a function of the requisite independent variables, it is well within the purview of one skilled in the art of process control to determine these factors for any particular situation.

The cooled effluent gases, in whole or in part, are then recycled to at least one point within the decomposition zone. For example, one might recycle only a portion of the cooled effluent gases and use the remaining portion to mix with uncooled effluent gas before its discharge into the atmosphere. On the other hand all of the cooled effluent gas may be recycled and the uncooled effluent gas may be separately cooled in a second cooling zone prior to discharge. The variants are largely a matter of choice, or they may be dictated by other constraints placed on the process, but in all events they are well within the skill of the ordinary person in the art.

Earlier we had alluded to the desirability of modifying the described process where the $N_2O$-containing gas stream also contained $NO_x$, particularly at concentrations above about 50 ppm, and especially above about 100 ppm. We have observed that the effectiveness of many catalysts for $N_2O$ decomposition is significantly impaired by $NO_x$. Thus, when the gas stream to be treated also contains $NO_x$ one frequently observes a substantial decrease in catalyst activity, which necessitates an analogous decrease in gas hourly space velocity or an increase in operating temperature where possible, in order that the desired degree of $N_2O$ decomposition be maintained. Alternatively, one might experience a substantial decrease in catalyst lifetime, necessitating more frequent catalyst regeneration and/or replacement. Whatever the particulars of the scenario it is clear that the presence of $NO_x$ in the $N_2O$-containing feed gas is detrimental. In these cases it is highly desirable to remove $NO_x$ in a zone prior to the $N_2O$-decomposition zone. The removal of $NO_x$ from various kinds of waste gases is a well known process practiced in many variants and needs to extensive discussion. See, e.g., Kirk-Othmer, "Encyclopedia of Chemical Technology," 3rd Edition, Vol. 9, pp. 527-30. One quite highly preferred variant is the selective reduction of $NO_x$ with ammonia in the presence of oxygen, often catalyzed by precious metals. In this variant, which is particularly suitable in the practice of our invention, any excess ammonia exiting the $NO_x$-decomposition zone and entering the $N_2O$-decomposition zone will not be harmful to most of the $N_2O$-decomposition catalysts and in fact will itself be decomposed in the $N_2O$-decomposition zone, with the quite desirable consequence that the gaseous effluent discharged into the atmosphere does not have to be separately treated to remove ammonia.

Our invention may perhaps be better understood with reference to FIG. 1, which represents the process flow and illustrates how the invention may be better practiced. Feedstock 1 is the $N_2O$-containing waste gas stream. Where it also contains $NO_x$, particularly at concentrations above about 50 ppm and especially above 100 ppm, it is first directed to a $NO_x$-removal zone 2, where the dotted lines indicate this is an optional zone whose presence or use will be dictated by the amount of $NO_x$ in 1 as well as the particular catalyst used for $N_2O$ decomposition. Stream 7 is then the effluent from the $NO_x$-removal zone or, where such zone is absent, feedstock 1. Stream 7 enters the $N_2O$-decomposition zone 14 containing a suitable $N_2O$-decomposition catalyst and where $N_2O$ is catalytically decomposed into $N_2$ and $O_2$ and whose effluent gases, depleted in $N_2O$, exit at 20. The gas stream is then split into the discharge stream 25 and a stream 28 which is passed into cooling zone 30. The stream 28 is cooled within zone 30 to a temperature or by an amount suitable to moderate the exothermic $N_2O$ decomposition as determined by the process design variables. The cooled exit gases from 30 are then recycled, in whole or in part, as indicated by stream 55, with the remainder if any discharged in stream 50. The cooled gas stream 55 is recycled to the decomposition zone 14 either by combination with stream 7, by entering the decomposition zone at a point different from the entry point for stream 7, or any combination of these.

Figure 2:
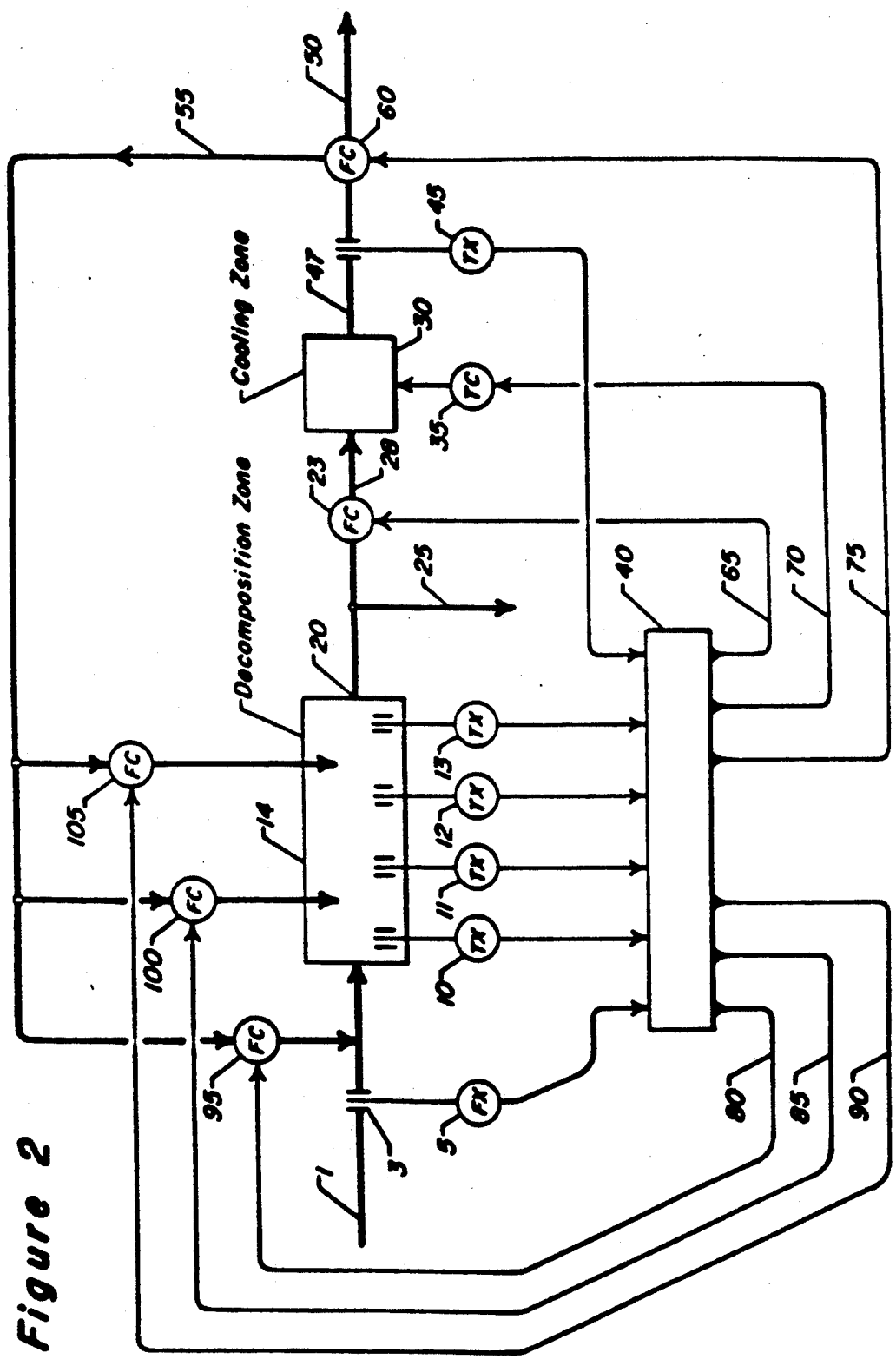
FIG. 2 shows a similar process flow diagram with associated process controls.

Our invention is quite amenable to process control. FIG. 2 illustrates one particular type of control system configuration which may be used in our invention, but it will be recognized that our invention extends to different types of control system configurations which accomplish the same purpose in essentially the same way and with essentially the same results. Process flow is given by heavy lines and flow direction is indicated by the bolded arrows. Signals are indicated by normal lines, with normal arrows indicating the direction of signal transmission. Transducers are given as circles having two-letter designations ending in X, and controllers are circles having two-letter designations ending in C. Generally the signals provided by any transducer will be electrical in form and may be either analog or digital. For simplicity any transducer for analog-digital conversion is omitted, as is any transducer for conversion of pneumatic, mechanical, or hydraulic signals to electrical signals. For generality the figure is drawn so that each sensing means or sensor, uniformly designated by the symbol " || ", is separate from its transducing means or transducer, but it needs to be recognized that in many cases the sensing means and transducing means are congruent, i.e., one device performs both functions, as is the case for example with a thermocouple or thermistor.

Referring to FIG. 1, the feedstock designated as 1 is either the waste gas stream or the effluent from the $NO_x$-removal zone if one is present. Flow sensor 3 in combination with transducer 5 provides a signal representative of the feedstock flow rate as input to computer or processor 40. Conditions within the decomposition zone 14 are such as to decompose $N_2O$ into nitrogen and oxygen, which means inter alia that at some point within the decomposition zone the temperature must be sufficient to ensure and sustain $N_2O$ decomposition. At least one, and usually a multiplicity, of temperature sensing means is placed within the decomposition zone and each in conjunction with its transducer provides a signal representative of the local temperature in the environs of the temperature sensing means. The figure shows four sensors and four transducers TX—10, 11, 12, and 13—but it needs to be understood that this number is arbitrary. The sole constraint is that at least one temperature sensing means-transducing means combination is necessary. Each temperature sensor-transducer signal is used as a separate input to the computer or processor.

Hot effluent gases exit the decomposition zone at 20 and the effluent gas stream is split by flow controlling means (flow controller) 23 into a discharge stream 25 and a stream 28 flowing into the cooling zone 30. The amount of heat removed from stream 28, i.e., the degree of cooling effected in cooling zone 30, is controlled by the temperature controlling means (temperature controller) 35. Another temperature sensing means-transducing means combination 45 provides a signal representative of the temperature of the cooled effluent gas stream 47, and this signal is also used as input to 40. The effluent gas stream is then split into a discharge stream 50 and a recycle stream 55 by flow controller 60.

The computer or processor 40 receives as input at least the signals provided by each sensor in conjunction with its transducer. These signals are representative, for example, of the feedstock flow rate, the temperature at various points along the decomposition zone, and the temperature of the cooled effluent gas stream. Using an algorithm based on such variables as the reactor design, the exotherm generated by the particular waste gas stream, the feed rate of the waste gas stream into the decomposition zone, the specific catalyst used, the heat loss from the decomposition zone, and so on, the computer or processor will generate output signals to various controllers whose net effect is to maintain the temperature at all points with decomposition zone within predetermined limits.

For example, output signal 65 is provided to flow controller 23 and determines what fraction of the effluent gases exiting from the decomposition zone 14 is passed into the cooling zone 30. Output signal 70 is provided to temperature controller 35, which determines the amount of heat removed from the effluent gas stream 28 entering cooling zone 30. A separate output signal 75 is sent to flow controller 60 which acts essentially as a stream splitter for the cooled effluent gases exiting cooling zone 30. Flow controller 60 recycles all or part of the effluent gas stream as recycle stream 55 with the remaining portion being discharged as stream 50.

The cooled effluent gas stream 55 is recycled to the decomposition zone 14 and/or to the $N_2O$-containing waste gas stream 1 used as the feedstock for the process. FIG. 1 has illustrated two recycle points within the decomposition zone but it will be recognized that the number is arbitrary. That is, it may be largely a matter of design choice whether the cooled effluent gas stream is recycled only to the incoming feed gas stream 1, whether it is recycled only to the decomposition zone 14, or whether it is recycled to both the feedstock and the decomposition zone. If the cooled effluent gas stream is recycled to decomposition zone 14, it is largely a matter of design choice as to where within the decomposition zone the recycled gas enters and how many recycle entry ports are present. In any event, output signals 80, 85, and 90, which are provided to flow controllers 95, 100, and 105, resp., act in combination to direct the cooled effluent gas stream 55 to those points predetermined to be most effective for the particularities of the process at hand.

What is claimed is:

1. A process for the decomposition of $N_2O$ in a gas stream comprising:
   1) passing an $N_2O$-containing gas stream into a $N_2O$-decomposition zone, having a permissible maximum temperature, $T_{max}$, corresponding to the lower of the onset of catalyst sintering or $NO_x$ formation, where said $N_2O$-containing gas stream is brought into contact under $N_2O$-decomposition conditions with a catalyst effecting decomposition of $N_2O$ into nitrogen and oxygen to afford an effluent gas stream depleted in $N_2O$ and enriched in nitrogen and oxygen;

2) cooling at least a portion of the effluent gas stream to afford a cooled effluent gas stream; and 3) recycling at least a portion of the cooled effluent gas stream to the $N_2O$-decomposition zone so as to maintain all temperatures in the $N_2O$-decomposition zone below $T_{max}$.

2. The process of claim 1 where the $N_2O$-containing gas stream contains $N_2O$ at a concentration up to about 65 volume percent.

3. The process of claim 2 where the $N_2O$-containing gas stream contains $N_2O$ at a concentration up to about 35 volume percent.

4. The process of claim 2 further characterized in that the gas stream also contains water.

5. The process of claim 2 further characterized in that the gas stream also contains oxygen at a concentration of at least 0.5 volume percent.

6. A process for the decomposition of $N_2O$ in a gas stream comprising:

1) passing an $N_2O$-containing gas stream into a $N_2O$-decomposition zone, having a permissible maximum temperature, $T_{max}$, corresponding to the lower of the onset of catalyst sintering or $NO_x$ formation, where said $N_2O$-containing gas stream is brought into contact under $N_2O$-decomposition conditions with a catalyst effecting decomposition of $N_2O$ into nitrogen and oxygen to afford an effluent gas stream depleted in $N_2O$ and enriched in nitrogen and oxygen;

2) cooling at least a portion of the effluent gas stream to afford a cooled effluent gas stream;

3) recycling at least a portion of the cooled effluent gas stream to the $N_2O$-decomposition zone;

4) measuring the temperature at least one point within the $N_2O$-decomposition zone; and 5) controlling by means of a predetermined algorithm using the measured temperature a) the rate of passing the $N_2O$-containing gas stream into the $N_2O$-decomposition zone, b) the degree of cooling of the effluent gas stream, c) the amount of cooled effluent gas stream recycled to the $N_2O$-decomposition zone, or any combination thereof, where said algorithm maintains all temperatures in the $N_2O$-decomposition zone below $T_{max}$.

7. A process for the decomposition of $N_2O$ in a waste gas stream containing $NO_x$ comprising:

1) passing said gas stream into a $NO_x$-removal zone to afford a first effluent gas stream depleted in $NO_x$;

2) passing the first effluent gas stream into a $N_2O$-decomposition zone, having a permissible maximum temperature, $T_{max}$, corresponding to the lower of the onset of catalyst sintering or $NO_x$ formation, where said first effluent gas stream is brought into contact under $N_2O$-decomposition conditions with a catalyst effecting decomposition of $N_2O$ into nitrogen and oxygen to afford a second effluent gas stream depleted in $N_2O$ and enriched in nitrogen and oxygen;

3) cooling at least a portion of the second effluent gas stream to afford a cooled effluent gas stream; and 4) recycling at least a portion of the cooled effluent gas stream to the $N_2O$-decomposition zone so as to maintain all temperatures in the $N_2O$-decomposition zone below $T_{max}$.

8. The process of claim 7 where the $N_2O$-containing gas stream contains $N_2O$ at a concentration up to about 65 volume percent.

9. The process of claim 8 where the $N_2O$-containing gas stream contains $N_2O$ at a concentration up to about 35 volume percent.

10. The process of claim 8 further characterized in that the gas stream also contains water.

11. The process of claim 8 further characterized in that the gas stream also contains oxygen at a concentration of at least 0.5 volume percent.

12. The process of claim 7 where the waste gas stream contains $NO_x$ at a concentration of at least about 50 ppm.

13. The process of claim 12 where the concentration is at least about 100 ppm.

14. The process of claim 7 further characterized in that the $NO_x$ is depleted in the $NO_x$-removal zone by reduction with ammonia.

* * * * *